(12) United States Patent
Jin et al.

(10) Patent No.: US 12,503,091 B2
(45) Date of Patent: Dec. 23, 2025

(54) BRAKE PEDAL SIMULATOR, BRAKE PEDAL FEEL SELECTION MODULE AND VEHICLE BRAKING SYSTEM

(71) Applicant: Volvo Car Corporation, Gothenburg (SE)

(72) Inventors: Yongxing Jin, Shanghai (CN); Hongchao Yu, Shanghai (CN); Jiangliu Su, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 470 days.

(21) Appl. No.: 18/113,245

(22) Filed: Feb. 23, 2023

(65) Prior Publication Data

US 2023/0264666 A1    Aug. 24, 2023

(30) Foreign Application Priority Data

Feb. 24, 2022  (CN) .......................... 202210171761.8

(51) Int. Cl.
*B60T 8/40* (2006.01)
*B60T 13/66* (2006.01)
*B60T 13/68* (2006.01)
*B60T 13/74* (2006.01)

(52) U.S. Cl.
CPC ............ *B60T 8/409* (2013.01); *B60T 13/662* (2013.01); *B60T 13/686* (2013.01); *B60T 13/745* (2013.01)

(58) Field of Classification Search
CPC ......... B60T 8/4081–409; B60T 13/662; B60T 13/686; B60T 13/745; B60T 7/042
See application file for complete search history.

(56) References Cited

U.S. PATENT DOCUMENTS 9,415,758 B2 * 8/2016 Drumm ................. B60T 13/686
2003/0205932 A1   11/2003 Anderson

FOREIGN PATENT DOCUMENTS

| CN | 112208501 A | 1/2021 |
| CN | 113104011 A | 7/2021 |
| DE | 102018219523 A1 | 2/2020 |
| KR | 20140143890 A | 12/2014 |
| WO | 2021130603 A1 | 7/2021 |

OTHER PUBLICATIONS

Jul. 20, 2023 European Search Report issued in corresponding EP Application No. 23157881.

* cited by examiner

*Primary Examiner* — David R Morris
(74) *Attorney, Agent, or Firm* — Clements Bernard Walker; Christopher L. Bernard

(57) ABSTRACT

A brake pedal simulator including a simulator cylinder; a simulator piston within the simulator cylinder, a simulation chamber being defined between the simulator piston and a first end of the simulator cylinder; and an elastically deformable component and an adjusting component, the elastically deformable component being arranged between the simulator piston and the adjusting component and placed in a pre-deformed state by them, and the adjusting component being movable to change the amount of elastic deformation of the elastically deformable component so that it can assume a plurality of pre-deformed states and maintain the elastically deformable component in each of the plurality of pre-deformed states. A brake pedal feel selection module includes the brake pedal simulator and a vehicle brake system includes the brake pedal feel selection module.

17 Claims, 4 Drawing Sheets

BRAKE PEDAL SIMULATOR, BRAKE PEDAL FEEL SELECTION MODULE AND VEHICLE BRAKING SYSTEM

CROSS-REFERENCE TO RELATED DISCLOSURE

The present disclosure claims the benefit of priority of the Chinese Patent Disclosure No. 202210171761.8, filed on Feb. 24, 2022 and entitled "Brake Pedal Simulator, Brake Pedal Feel Selection Module and Vehicle Brake system", the contents of which are incorporated in full by reference herein.

TECHNICAL FIELD

The present disclosure relates to a brake pedal simulator capable of providing a plurality of base pedal reacting forces, a brake pedal feel selection module capable of providing a plurality of different brake pedal feels, and a vehicle brake system comprising the brake pedal feel selection module.

BACKGROUND

Currently, many vehicle brake systems adopt an electro-hydraulic braking mode and have advantages of fast response, high control accuracy, consistent pedal characteristics, and good integration with vehicle brake control systems and thus have good development prospects, compared with traditional hydraulic brake systems.

In an electro-hydraulic brake system, there are no direct hydraulic and mechanical connections between a brake pedal and brake wheel cylinders of a vehicle, and a braking force on wheels cannot be fed back to the brake pedal to be felt by a driver when the wheels are braked. The electro-hydraulic brake system uses a brake pedal simulator to simulate the characteristics of the brake pedal, reflects the driver's braking intentions more accurately and reliably, and enables the driver to perceive a braking feel.

A brake pedal feel is a feedback perceived by the driver when he/she depresses the brake pedal, and is typically associated with a pedal force on the brake pedal and a pedal travel of the brake pedal when the driver depresses the brake pedal as well as a deceleration rate of the vehicle. For a one-brake-module (One-Box) brake system that integrates an active pressure building unit that comprises the brake pedal and a brake master cylinder and a wheel cylinder brake unit that comprises a brake pump and the brake wheel cylinders, the relationship between the pedal force and the pedal travel is set in advance by an original manufacturer using a brake pedal simulator hardware that is un-adjustable for an end user (a user or driver of the vehicle).

The brake pedal simulator hardware, un-adjustable for the end user, can't meet different needs, preferences or habits of different drivers in terms of brake pedal feels during vehicle braking operations while they drive a (for example, one and the same) vehicle. In addition, different brands of vehicles or different models of vehicles of the same brand may have different brake pedal simulators, and thus provide different brake pedal feels even for the same driver, which makes it more difficult to meet the different needs of the different drivers. To modify the brake pedal simulators to accommodate to the preferences of the different drivers on the different brake pedal feels, the design of the brake pedal simulators needs to be changed, which involves considerable time and manpower (designer) and material resources (manufacturing lines, molds, etc. of components of the brake pedal simulator) and therefore is not feasible in practice.

SUMMARY

In order to solve the above problems, the present disclosure provides a vehicle brake system that is friendly to the end user and allows the end user to adjust or select the brake pedal feel according to his or her preference.

To this end, according to a first aspect of the present disclosure, there is provided a novel brake pedal simulator with its elastically deformable component capable of being placed and maintained in a plurality of different pre-deformed states by an adjusting component of the brake pedal simulator and thus capable of providing a plurality of different pre-loaded forces.

A brake pedal simulator for a vehicle brake system of the present disclosure comprises:

a cylindrical simulator cylinder having a first end;

a simulator piston provided in the simulator cylinder, wherein the simulator piston and the first end of the simulator cylinder define a simulator chamber therebetween, and the first end has a brake fluid port configured to place the simulator chamber and a master cylinder chamber of a brake master cylinder of the vehicle brake system in fluid communication with each other; and an elastically deformable component and an adjusting component, wherein the elastically deformable component is arranged between the simulator piston and the adjusting component and is placed in a pre-deformed state by the simulator piston and the adjusting component, and the adjusting component is movable to change an amount of elastic deformation of the elastically deformable component so that the elastically deformable component can assume a plurality of pre-deformed states and is capable of maintaining the elastically deformable component in each of the plurality of pre-deformed states.

In an embodiment, the adjusting component is an adjusting piston provided in the simulator cylinder.

In an embodiment, the simulator cylinder has a second end opposite to the first end, wherein the adjusting piston and the second end define a closed adjusting chamber therebetween, and an adjusting fluid is supplied to and discharged from the adjusting chamber, resulting in displacement of the adjusting component.

In an embodiment, the elastically deformable component comprises one or more elastic elements, the elastic elements each being provided as an elastomeric block or a spring.

In an embodiment, the elastically deformable component comprises a first elastic element, opposite ends of the first elastic element abutting the simulator piston and the adjusting component, respectively.

In an embodiment, the elastically deformable component further comprises a second elastic element, the second elastic element having a first end abutting the simulator piston and an opposite second end fixed relative to the simulator cylinder.

In an embodiment, the first elastic element and the second elastic element are arranged in parallel and the first elastic element is arranged in the second elastic element.

In an embodiment, being fixed relative to the simulator cylinder comprises abutting or attaching to a stop, the stop being provided separately and secured to the simulator cylinder or being an integral portion protruding inwardly from the simulator cylinder.

In an embodiment, the elastically deformable component further comprises a second elastic element arranged in series with the first elastic element, the second elastic element having a first end abutting the simulator piston and a second end abutting the first elastic element.

In an embodiment, the plurality of pre-deformed states include a plurality of consecutive pre-deformed states between a first threshold pre-deformed state and a second threshold pre-deformed state, or the plurality of pre-deformed states include a plurality of pre-deformed states set in a discrete manner.

According to a second aspect of the present disclosure, there is provided a brake pedal feel selection module configured to allow an end user of a vehicle to select a preferred brake pedal feel option from a plurality of preset brake pedal feel options prior to starting of the vehicle.

A brake pedal feel selection module for a vehicle brake system of the present disclosure comprises:

a controller which is configured to provide a plurality of brake pedal feel options corresponding to a plurality of brake pedal feels and comprises a human-machine interface via which a user can select a desired brake pedal feel option from the plurality of brake pedal feel options;

the brake pedal simulator; and a driving component for driving the adjusting component of the brake pedal simulator to displace it;

wherein the controller is configured to activate the driving component to actuate the adjusting component to displace it based on the desired brake pedal feel option selected by the user, the displacement of the adjusting component changing the amount of elastic deformation of the elastically deformable component, and deactivate the driving component to maintain the elastically deformable component in a pre-deformed state corresponding to the desired brake pedal feel option when the elastically deformable component is placed in the pre-deformed state.

In an embodiment, the driving component actuates the adjusting component in at least one of hydraulic, pneumatic and mechanical manners.

In an embodiment, the adjusting component is an adjusting piston provided in the simulator cylinder, and a second end of the simulator cylinder opposite to the first end and the adjusting piston define a closed adjusting chamber therebetween, and the driving component comprises a driving pump and an inlet control valve which are in fluid communication with an adjusting fluid inlet of the adjusting chamber, and an outlet control valve which is in fluid communication with an adjusting fluid outlet of the adjusting chamber.

In an embodiment, the driving pump is an electro-hydraulic pump or a pneumatic pump.

In an embodiment, the human-machine interface is in the form of one or more buttons or toggles actuated by a pressing or toggling action, or in the form of one or more knobs actuated by a rotating action, or in the form of a dialog box to allow the user to enter information.

A third aspect of the present disclosure provides a vehicle brake system that comprises such a brake pedal feel selection module.

A vehicle brake system of the present disclosure comprises: a brake pedal; the brake master cylinder comprising a master cylinder piston actuated by the brake pedal and the master cylinder chamber in fluid communication with a brake fluid reservoir; and the brake pedal feel selection module, wherein the simulation chamber of the brake pedal simulator is in fluid communication with the brake master cylinder via the brake fluid port.

In an embodiment, the vehicle brake system further comprises: a wheel cylinder brake unit comprising: a brake pump, the brake fluid reservoir in fluid communication with the brake pump, and four brake wheel cylinders in fluid communication with the brake pump, wherein the driving component of the brake pedal feel selection module comprises the brake pump and an adjusting fluid is the brake fluid, or, the driving component is a driving pump provided separately and independently of the brake pump and the adjusting fluid is the brake fluid or a fluid different from the brake fluid.

In an embodiment, the vehicle brake system further comprises: a brake control unit in communication with a master cylinder travel sensor for measuring a pedal travel of the brake pedal and with the brake pump, the brake control unit being configured to activate the brake pump based on the pedal travel measured by the master cylinder travel sensor so that the brake fluid is supplied to the brake wheel cylinder by the brake pump, wherein the controller of the brake pedal feel selection module is integrated in the brake control unit or provided independently of the brake control unit.

In an embodiment, an active pressure building unit comprising the brake pedal, the brake master cylinder and the brake pedal simulator and the wheel cylinder brake unit are arranged in a single brake module.

The present disclosure also relates to a method of vehicle braking performed with the vehicle brake system, the method comprising a step of selecting a brake pedal feel option by a user prior to starting the vehicle, the step comprising: a selection sub-step in which the user selects one brake pedal feel option from the plurality of brake pedal feel options provided by the brake pedal feel selection module via the human-machine interface of the controller of the brake pedal feel selection module; an adjusting sub-step in which the controller activates the driving component of the brake pedal feel selection module based on the brake pedal feel option the user selects, and the driving component drives the adjusting component of the pedal simulator to displace the adjusting component, the displacement of the adjusting component causing the elastically deformable component to be placed in a pre-deformed state corresponding to the selected brake pedal feel option; and a maintaining sub-step in which the controller deactivates the driving component so that the adjusting component maintains the elastically deformable component in the pre-deformed state corresponding to the selected brake pedal feel option.

In an embodiment, the selection sub-step is achieved by the user pressing a button or toggling a toggle or turning a knob or entering the one brake pedal feel option in a dialog box.

The brake pedal feel selection module of this disclosure comprises the brake pedal simulator described above. The brake pedal feel selection module enables the driver to select a desired brake pedal feel option according to his or her preference via the human-machine interface of the controller. Based on the driver's input, the controller activates the driving component of the module to actuate the movable adjusting component of the brake pedal simulator to displace it so as to place and maintain the elastically deformable component in one of the preset plurality of pre-deformed states, i.e., the pre-deformed state corresponding to the desired brake pedal feel option selected, as a result of which the elastically deformable component provides a pre-loaded force corresponding to the desired brake pedal feel option selected. In this condition, with the vehicle being started and the vehicle braking operations being performed, the driver obtains the desired brake pedal feel he prefers.

The vehicle braking system including the above brake pedal feel selection module enables the driver to select the brake pedal feel option suitable for himself according to his own preferences to obtain the desired brake pedal feel, which is very friendly to the end user of the vehicle in the brake pedal feel selection module various possible brake pedal feel options can be preset which can be applied to different brands and models of vehicles, and thus the module has excellent versatility.

BRIEF DESCRIPTION OF THE DRAWINGS

The principles and aspects of this disclosure will be understood more fully from the detailed description below in conjunction with the accompanying drawings. It should be noted that the drawings may not be depicted to scale for illustration purpose, but this does not affect the understanding of the present disclosure. In the drawings.

DESCRIPTION OF EMBODIMENTS

As mentioned above, the present disclosure aims to improve existing vehicle brake systems, in particular electro-hydraulic brake systems, to provide them with a plurality of brake pedal feel options and to allow a driver to select a brake pedal feel option that meets his or her preference from the preset plurality of brake pedal feel options before the vehicle starts and the vehicle brake system performs a braking function (a brake pedal is depressed) to obtain an improved pedal feel comfort, which makes the vehicle brake systems more user-friendly. The principles of this disclosure will be described in detail in the following with reference to the drawings.

Figure 1:
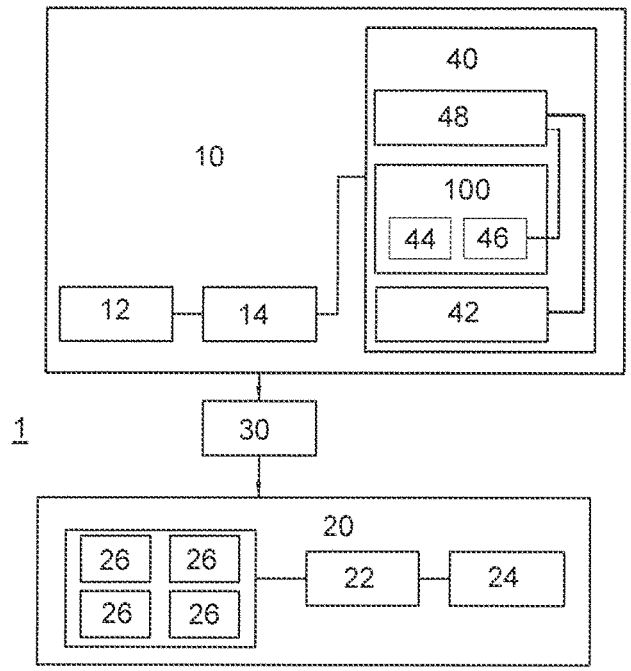
FIG. 1 is a schematic block diagram of a vehicle brake system of the present disclosure.
Figure 2:
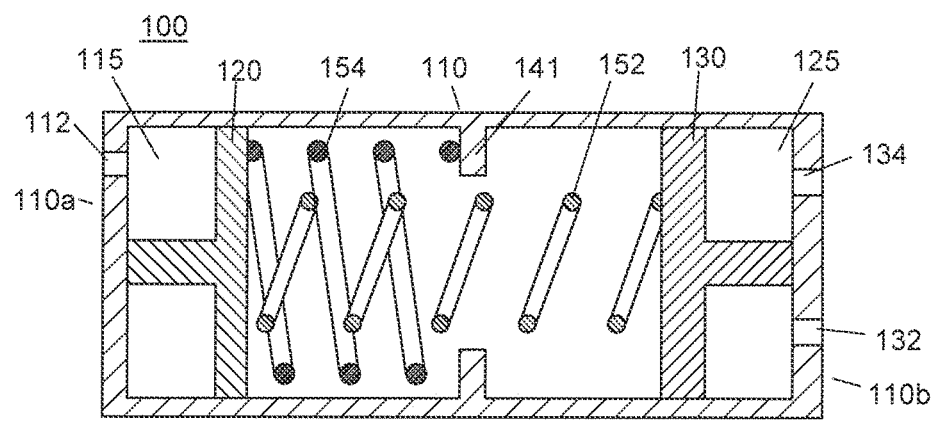
FIG. 2 is a structural illustration of a brake pedal simulator constructed according to a first embodiment of the present disclosure.

FIG. 1 is a schematic block diagram of a vehicle brake system of the present disclosure; FIG. 2 is a structural illustration of a brake pedal simulator constructed according to a first embodiment of the present disclosure; and FIG. 3 is a structural illustration of a hydraulic circuit of a vehicle brake system comprising the brake pedal simulator of FIG. 2.

Figure 3:
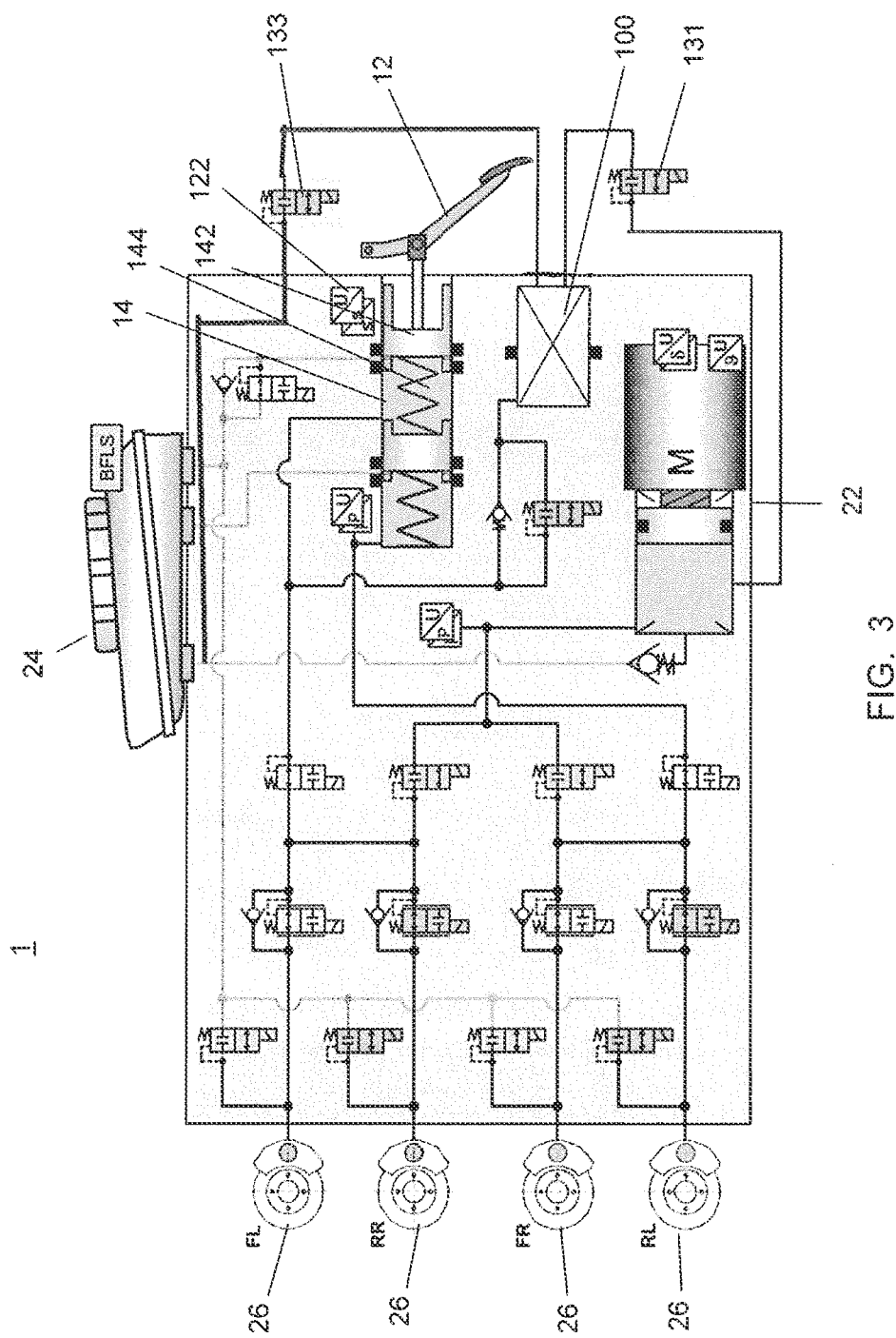
FIG. 3 is a structural illustration of a hydraulic circuit of a vehicle brake system comprising the brake pedal simulator of FIG. 2.

Referring to FIGS. 1 and 3 first, a vehicle brake system 1 comprises an active pressure building unit 10, a wheel cylinder brake unit 20 and a brake control unit 30. The active pressure building unit 10 comprises a brake pedal 12, a brake master cylinder 14 associated with the brake pedal 12, and a brake pedal feel selection module 40 associated with the brake master cylinder 14. The active pressure building unit 10 further comprises a master cylinder travel sensor 122 (FIG. 3) for detecting a master cylinder travel of the brake master cylinder 14 to obtain a pedal travel of the brake pedal 12.

The wheel cylinder brake unit 20 comprises a brake pump 22, a brake fluid reservoir 24 which can be placed into fluid communication with the brake pump 22 and the brake master cylinder 14, and four brake wheel cylinders 26 which can be placed into fluid communication with the brake pump 22. In vehicle braking operations, brake fluid is provided to the brake wheel cylinders 26 by the brake pump 22.

The brake control unit 30 is in communication with the master cylinder travel sensor 122 of the active pressure building unit 10 and the brake pump 22 of the wheel cylinder brake unit 20. When the brake pedal 12 is depressed by a driver, the master cylinder travel sensor 122 feeds the pedal travel of the brake pedal to the brake control unit 30, and the brake control unit 30 instructs the brake pump 22 to pump a required amount of brake fluid corresponding to the pedal travel to the brake wheel cylinders 26 based on the received pedal travel to achieve braking of the vehicle. As shown in FIG. 1 and described above, the vehicle brake system 1 is an electro-hydraulic brake system in which the active pressure building unit 10 is not hydraulically connected or mechanically connected to the wheel cylinder brake unit 20 directly.

The active pressure building unit 10 of the vehicle brake system 1 further comprises a brake pedal feel selection module 40 including a brake pedal simulator 100 (FIG. 1). The brake pedal simulator 100 is configured to provide a feedback on a desired pedal force at a current braking strength to the driver, giving the driver a braking feel. The brake pedal feel selection module 40 is configured to provide a plurality of brake pedal feel options and to allow the driver to select a desired brake pedal feel option from the plurality of brake pedal feel options before the vehicle is started and the vehicle braking operations are performed so as to obtain a brake pedal feel that meet their preference.

As shown, generally, the brake pedal feel selection module 40 comprises a brake pedal feel selection controller (referred to herein as "controller") 42, an elastically deformable component 44 and a movable adjusting component 46 provided by the brake pedal simulator 100, and a driving component 48.

The controller 42 of the brake pedal feel selection module 40 comprises a human-machine interface that is configured to receive input from a user or driver. The driver can select the desired brake pedal feel option from the plurality of brake pedal feel options (corresponding to different brake pedal feels) provided or pre-set by this brake pedal feel selection module 40 via the human-computer interface.

The controller 42 may be a control unit provided separately or may be integrated with the brake control unit 30. The human-computer interface of the controller 42 may be of any form known to those skilled in the art. In one embodiment, the human-computer interface comprises a plurality of selective buttons, toggles or knobs or switches corresponding to the plurality of brake pedal feel options, and the driver can make an alternative selection by actions such as pressing, toggling or rotating. In some embodiments, the human-machine interface may be in the form of a dialog box into which the driver may enter information corresponding to the desired brake pedal feel option according to prompts.

The brake pedal simulator 100 of the brake pedal feel selection module 40 comprises the elastically deformable component 44 which is typically linearly deformable (including a first elastic element 152 and a second elastic element 154 in an exemplary structure of the brake pedal simulator 100 shown in FIG. 2, which will be further described in detail below) and the movable adjusting component 46 (an adjusting piston 130 in the exemplary structure of the brake pedal simulator 100 shown in FIG. 2, which will be further described in detail below), wherein the adjusting component 46 engages an end of the elastically deformable component 44 or engages the elastically deformable component 44 at any other appropriate location and changes an amount of elastic deformation of the elastically deformable component 44 when the adjusting component 46 is displaced.

The driving component 48 of the brake pedal feel selection module 40 is communicatively connected with and controlled by the controller 42 and is configured to drive the adjusting component 46 to move or displace.

For the brake pedal feel selection module 40, firstly, the user or driver selects the desired brake pedal feel option via the human-machine interface of the controller 42. Secondly, the controller 42 activates the driving component 48 based on the brake pedal feel option selected by the driver, and then the driving component 48 drives the adjusting component 46 of the brake pedal simulator 100 to displace it to change the amount of elastic deformation of the elastically deformable component 44, until the elastically deformable component 44 reaches a desired pre-deformed state (the amount of elastic deformation) corresponding to the selected brake pedal feel option and thus has a pre-loaded force associated with the selected brake pedal feel option. Finally, the controller 42 controls the driving component 48 to stop the adjusting component 46, and the elastically deformable component 44 is maintained at the pre-loaded force. When the vehicle is started and the vehicle braking operations are performed in this condition, the driver can obtain the desired brake pedal feel.

During the process, the displacement of the adjusting component 46 changes the amount of elastic deformation of the elastically deformable component 44 and thus changes its elastically deformed state (the elastically deformed state is also referred to as the "pre-deformed state" in the context since the brake pedal 12 hasn't been depressed and the vehicle braking operations haven't been performed at this time) and its pre-loaded force. Under the action of the driving component 48, the adjusting component 46 is displaced so that the pre-deformed state or pre-loaded force of the elastically deformable component 44 corresponds to the desired brake pedal feel option selected by the user.

During the displacement of the adjusting component 46, the elastically deformable component 44 may assume and be maintained in a plurality of (such as two, three, four, five, etc.) different pre-deformed states or amounts of elastic deformation or pre-loaded forces corresponding to a plurality of different brake pedal feel characteristics of the brake pedal, providing the driver with different brake pedal feels during vehicle braking. The pre-loaded forces that can be provided by the elastically deformable component 44 may include a plurality of discrete values of the pre-loaded force. Correspondingly, the adjusting component 46 (e.g. the adjusting piston 130) has positions corresponding to the plurality of values of the pre-loaded force, respectively. Also correspondingly, the human-machine interface of the controller 42 may include a plurality of user-selectable "switching positions" or options or may include a plurality of different buttons or toggles. In some other embodiments, the plurality of pre-loaded forces may comprise a plurality of successive values of the pre-loaded force within a range between a minimum and a maximum of the pre-loaded force, and, correspondingly, the human-machine interface of the controller 42 may be configured as a user-rotatable stepless knob.

For each of the pre-deformed states or pre-loaded forces of the elastically deformable component 44, the driver has a different brake pedal feel when depressing the brake pedal 12. The greater the pre-loaded force is, the greater the pedal force is obtained for the same pedal travel and the "stiffer" brake pedal feel of the driver perceives. On the contrary, a smaller pre-loaded force results in a "softer" brake pedal feel of the driver.

It can be understood by those skilled in the art that the driving component 48 may drive the adjusting component 46 in any suitable manner, including, but not limited to, in a hydraulic mode (as in the illustrated embodiment), in a pneumatic mode, in a mechanical mode, or a combination thereof.

In the hydraulic or pneumatic mode, the driving component 48 may be provided in any form of pump and valve configuration. For example, the driving component 48 may be a pump and valve configuration that is shared with other units (e.g., the wheel cylinder brake unit 20) of the vehicle brake system or with other vehicle functional systems or subsystems other than the vehicle brake system. In this condition, with the active pressure building unit 10 and the wheel cylinder brake unit 20 being provided in a single brake module, the pump and valve configuration providing the driving function of the driving component 48 may be provided or integrated in the brake module. Still for example, the driving component 48 may be a pump and valve configuration dedicated to the brake pedal feel selection module 40, and, in this condition, the pump and valve configuration providing the driving function of the driving component 48 may be provided inside or outside of the brake module.

For example, in an embodiment described below in connection with FIGS. 2 and 3, the driving component 48 of the brake pedal feel selector module 40 comprises an electro-hydraulic pump which is also used as the brake pump 22 of the wheel cylinder brake unit 20, so that the adjusting piston 130 as the exemplary structure of the adjusting component 46 is actuated hydraulically with an adjusting fluid which is as same as the brake fluid supplied to the brake wheel cylinders 26. As described above, the driving component 48 in this disclosure is not limited to this particular form. For example, it can be contemplated that the adjusting piston 130 as the exemplary structure of the adjusting component 46 may be provided with a separate electric adjusting pump which may be fluidly communicated to the brake fluid reservoir 24, so that it is also the brake fluid which can be used as the adjusting fluid. In other embodiments, it can also be contemplated that a different fluid from the brake fluid may be used as the adjusting fluid. For example, it is also contemplated that a separate pneumatic adjusting pump may be provided for the adjusting piston 130 as the exemplary structure of the adjusting component 46 and then the adjusting fluid may be a gas. In embodiments where a separate adjusting pump other than the brake pump 22 is provided for the adjusting piston 130, the adjusting pump may be arranged or integrated in the same brake module as other components of the vehicle brake system, and, optionally, the adjusting pump may also be arranged outside of the brake module.

Detail description will be given below regarding the structure of the first embodiment of the brake pedal simulator 100 of the brake pedal feel selection module 40, with reference to FIG. 2.

The brake pedal simulator 100 comprises a simulator cylinder 110 defining a first end 110a and an opposite second end 110b. A simulator piston 120 is provided within the simulator cylinder 110 and defines a simulation chamber 115 with the first end 110a of the simulator cylinder 110. A brake fluid port 112 is formed in the simulator cylinder 110 and is placed in fluid communication to the simulation chamber 115. For example, the brake fluid port 112 may be formed in an end wall of the first end 110a of the simulator cylinder 110, to be fluidly communicated to the simulation chamber 115. The brake fluid port 112 is configured so that the simulation chamber 115 of the brake pedal simulator 100 is in fluid communication with a master cylinder chamber 144 of the brake master cylinder 14 of the active pressure building unit 10, to receive pressurized brake fluid from the brake master cylinder 14 when the brake pedal 12 is depressed and to return the brake fluid to the brake master cylinder 14 when the brake pedal 12 is released.

The simulator cylinder 110 is provided with the adjusting piston 130 therein which defines a closed adjusting chamber 125 between the adjusting piston 130 and a second end 110b of the simulator cylinder 110. An adjusting fluid inlet 132 and an adjusting fluid outlet 134 are formed at the second end 110b of the simulator cylinder 110 and are in fluid communication with the adjusting chamber 125. The adjusting piston 130 functions as the adjusting component 46 of the brake pedal feel selector module 40.

The aforementioned elastically deformable component 44 is arranged between the adjusting piston 130 and the simulator piston 120. The elastically deformable component 44 may comprise only one elastic element or a combination of a plurality of elastic elements, and the elastic element may include, but not limited to, any one or combination of a spring, an elastomeric block (e.g., a rubber block) or any other elastic element known in the art. In this embodiment, the elastically deformable component 44 comprises both the first elastic element 152 and the second elastic element 154.

The first elastic element 152 abuts directly the simulator piston 120, e.g. a surface of the simulator piston 120 facing away from the simulator chamber 115, at its first end and abuts the adjusting piston 130 at its opposite second end. The second elastic element 154 abuts directly the simulator piston 120 at its first end, and an opposite second end of the second elastic element 154 is fixed relative to the simulator cylinder 110, and, for example, abuts directly or attached to a fixed stop 141. The stop 141 may be an integral portion protruding inwardly from the simulator cylinder 110, or may be a separate stop fixedly attached to the simulator cylinder 110. The stop 141 may be an annular inwardly-protruding portion extending in a circumferential direction of the simulator cylinder 110 along the entire simulator cylinder 110, or one or more inwardly-protruding portions spaced apart from one another.

In the illustrated embodiment, a driving pump for the driving component 48 of the brake pedal feel selector module 40 is provided by the brake pump 22 of the wheel cylinder brake unit 20, and then the adjusting fluid inlet 132 of the simulator cylinder 110 is in fluid communication with the brake pump 22. It should be understood by those skilled in the art that, although the adjusting fluid inlet 132 and the adjusting fluid outlet 134 are shown separately in the drawings, they may be configured as one and the same opening.

For the vehicle brake system of FIG. 3 comprising the brake pedal simulator 100 of FIG. 2, before the vehicle is started and the vehicle brake system is operated, the user or driver enters the desired brake pedal feel option via the human-machine interface of the controller 42 or selects the desired brake pedal feel option from the predetermined plurality of brake pedal feel options, firstly. Secondly, the controller 42, based on the driver's input or selection, directly activates an inlet control valve 131 and actuates the brake pump 22 to replenish the adjusting fluid into the adjusting chamber 125 (when a "harder" brake pedal feel is desired), or activates an outlet control valve 133 to empty the adjusting chamber 125 and then activates the inlet control valve 131 and actuates the brake pump 22 to replenish the adjusting fluid into the adjusting chamber 125 (when a "softer" brake pedal feel is desired). During this process, the adjusting piston 130 as the exemplary structure of the adjusting component 46 moves away from or toward the second end 110b of the simulator cylinder 110 as the amount of adjusting fluid in the adjusting chamber 125 changes, to increase or decrease the amount of pre-elastic deformation and the pre-loaded force of the elastically deformable component 44 (the combination of the first elastic element 152 and second elastic element 154) (while the simulator piston 120 is stationary). Finally, the brake pump 22 controls the amount of adjusting fluid in the adjusting chamber 125 so as to obtain the pre-loaded force of the elastically deformable component 44 corresponding to the desired brake pedal feel option which is selected. In this way, the elastically deformable component 44 comprising the first elastic element 152 and the second elastic element 154 is placed in the pre-deformed state corresponding to the desired brake pedal feel option. After that, the vehicle can be started and the vehicle braking function can be activated.

The amount of adjusting fluid in the adjusting chamber 125 of the brake pedal simulator 100 controlled by the brake pump 22, the pre-deformed state to which the elastically deformable component 44 comprising the first elastic element 152 and the second elastic element 154 is elastically deformed by the adjusting piston 130, and the pre-loaded force which is achieved vary as the brake pedal feel option selected by the driver at the human-machine interface of the controller 42 varies, as a result of which the brake pedal feel the driver obtains subsequently varies accordingly during the vehicle braking operations.

During subsequent vehicle braking operations, the pressurized brake fluid in the master cylinder chamber 144 of the brake master cylinder 14 enters the simulation chamber 115 of the brake pedal simulator 100 when the brake pedal 12 is depressed; and the brake fluid in the simulation chamber 115 of the brake pedal simulator 100 returns back to the brake master cylinder 14 when the brake pedal 12 is released. In this way, the brake pedal simulator 100 provides the driver with the real braking feel corresponding to the selected brake pedal feel option. The difference of the related hydraulic components of the brake pedal simulator 100 before and after they are adjusted reflects or causes the difference between the actual pedal force generated when the brake pedal is depressed by the driver and a base pedal reacting force.

In this embodiment, the adjusting fluid outlet 134 of the adjusting chamber 125 is fluidly communicated to a source of adjusting fluid (the brake fluid reservoir 24) that is normally at the atmospheric pressure. But the disclosure is not limited to this, and the adjusting fluid outlet 134 can be fluidly communicated to any container at the atmospheric pressure.

The principles of the vehicle brake system of the present disclosure have been described in detail with reference to the first embodiment of the pedal simulator 100 of FIG. 2. However, it should be understood by those skilled in the art that the specific structure described above may be modified in any manner without departing from the principle of the present disclosure.

For example, in the vehicle brake system of FIG. 2, the pedal simulator 100 is typically provided in the vehicle brake module, achieving a compact structure, but this is not necessary. The adjusting component 46 of the pedal simulator 100 (e.g., the adjusting piston 130) is arranged within the simulator cylinder 110 to form the adjusting chamber 125 when it is driven in the hydraulical or pneumatical manner. However, in cases where the adjusting component 46 is driven in the mechanical manner by the driving component 48, the second end 110b of the simulator cylinder 110 and thus the adjusting chamber 125 do not have to be closed. In this case, the adjusting component 46 does not have to be in the form of the adjusting piston 130 which is engaged with an inner surface of the simulator cylinder 110 with its entire periphery, as long as it can be moved or rotated and can be engaged with the elastic deformable component 44 to change the amount of elastic deformation of it. For example, the adjusting component 46 may be a mechanical component that is attached to the simulator cylinder 110 in any manner and can be rotated and/or translated relative to the simulator cylinder 110.

Figure 4:
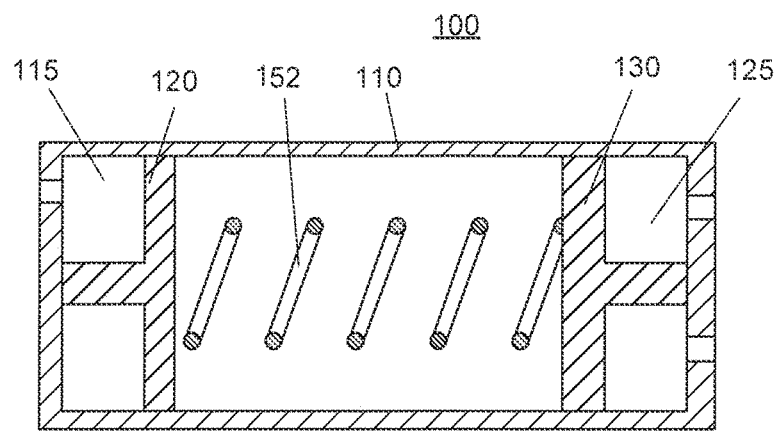
FIG. 4 is a structural illustration of a brake pedal simulator constructed according to a second embodiment of the present disclosure.

FIG. 4 illustrates a second embodiment of the pedal simulator 100. This embodiment differs from the first embodiment in that the elastically deformable component 44 of the pedal simulator 100 comprises only one elastic element, i.e., the first elastic element 152 of FIG. 2. By varying the amount of pre-compression of the first elastic element 152 (a spring as illustrated) in the same manner as previously described, the pre-loaded force of the first elastic element 152 as the elastically deformable component 44 can be changed and the same purpose can be achieved. In this embodiment, only one elastic element is used and thus the total number of components required is reduced, and the elastically deformable component 44 generally provides a smaller stiffness. In contrast, the elastically deformable component 44 comprising two (as in FIG. 2) or more elastic elements arranged in parallel generally provides a greater stiffness.

Figure 5:
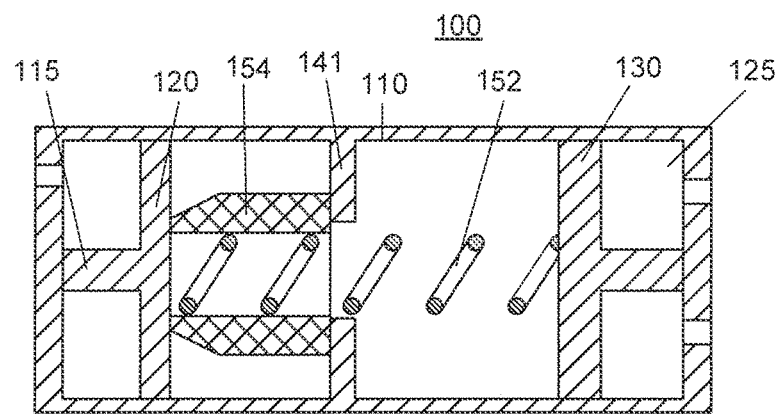
FIG. 5 is a variant of the brake pedal simulator shown in FIG. 2.

FIG. 5 illustrates a variant of the pedal simulator 100 of the first embodiment of FIG. 2, which differs from the pedal simulator 100 of FIG. 2 only in that the second elastic element 154 of the elastically deformable component 44 is configured as an elastomer block and the second elastic element 154 abuts the simulator piston 120 at one end and abuts the stop 141 at the other end. Likewise, the first elastic element 152 of the elastically deformable component 44 abuts the simulator piston 120 at one end and abuts the adjusting piston 130 at the other end. In a default position of the brake pedal 12 being not depressed, the second elastic element 154, which is fixed to be stationary at opposite ends, has the pre-deformed state or amount of pre-deformation which is constant and provides a constant pre-loaded force. By actuating the adjusting piston 130 to displace it, the pre-deformed state or the amount of pre-deformation of the first elastic element 152 can be changed to change its pre-loaded force. In this way, the pre-loaded force provided by the elastically deformable component 44 of the brake pedal simulator 100 which is the sum of the pre-loaded forces of the first elastic element 152 and the second elastic element 154 is variable, depending on the desired brake pedal feel option selected or entered by the user.

Figure 6:
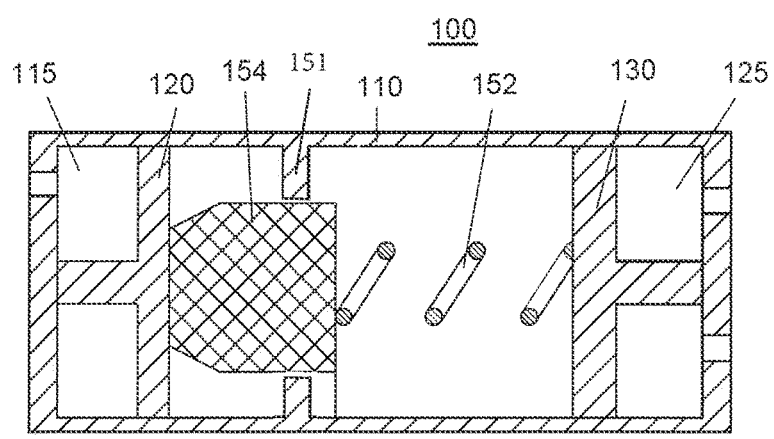
FIG. 6 is another variant of the brake pedal simulator shown in FIG. 2.

FIG. 6 shows another variant of FIG. 2. The first elastic element 152 and the second elastic element 154 are arranged in parallel in FIG. 5 and FIG. 2, and the first elastic element 152 and the second elastic element 154 are arranged in series in FIG. 6, with an annular protruding portion 151 (or a plurality of protruding portions in the form of annular segments) protruding inwardly from the simulator cylinder 110 for auxiliarily supporting or guiding the second elastic element 154. Auxiliarily supporting and guiding structures may also be provided for the first elastic element 152 in each embodiment if desired. It is also contemplated that, in cases where the first elastic element 152 and the second elastic element 154 are provided in parallel, the elastically deformable component 44 may further comprise one or more other (e.g. third) elastic elements, optionally each of which may be composed of a plurality of sub-elastic elements arranged in series.

Figure 7:
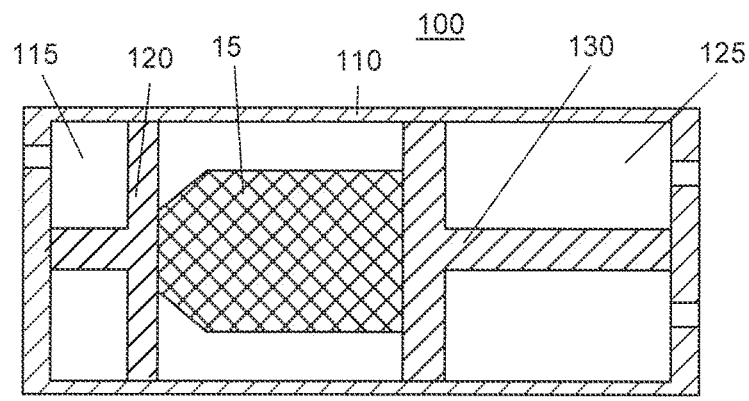
FIG. 7 is a variation of the brake pedal simulator shown in FIG. 4.

FIG. 7 illustrates a variant of the second embodiment of the pedal simulator 100 of FIG. 4, which differs from the pedal simulator 100 of FIG. 4 only in that the only elastic element of the elastically deformable component 44 is configured as an elastomeric block, for example, a rubber block, rather than a conventional coil spring. All other aspects are the same and will not be repeated here.

The principles of the vehicle brake system according to the present disclosure have been described in detail as above, in particular by providing the brake pedal feel selection module 40 comprising the improved brake pedal simulator 100, in which the driver is allowed to select or enter the desired one of the plurality of brake pedal feel options preset in the module in order to obtain the brake pedal feel which meets his preference. On one hand, the present disclosure improves flexibility of the vehicle end-user in selecting the brake pedal feel, accommodates to needs and preferences of different drivers with respect to the brake pedal feels, and improves user-friendliness. On the other hand, the module can be widely configured in various brands and models of vehicles, and thus has good versatility to meet the needs of various brake pedal feels.

Figure 8:
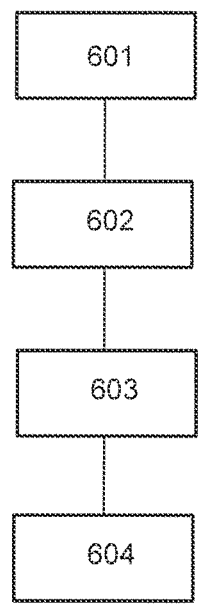
FIG. 8 is a flowchart of a method of vehicle braking performed with the vehicle brake system according to the present disclosure.

FIG. 8 illustrates a flowchart of a method of vehicle braking performed using the vehicle brake system according to the present disclosure.

In a step 601, prior to starting of the vehicle, the user or driver selects or enters one brake pedal feel option from the plurality of brake pedal feel options provided or pre-set by the module via the human-computer interface of the controller 42 of the brake pedal feel selection module 40. Depending on the specific form of the human-computer interface, such as a button, a toggle, a knob, a dialog box, or a voice recognition device, the step 601 may be performed by an action of the driver such as pressing or toggling or rotating or inputting.

In a step 602, the controller 42 activates the driving component 48 (comprising the driving pump and the inlet control valve 131, or the outlet control valve 133) of brake pedal feel selection module 40 based on the brake pedal feel option selected by the user, and the driving component 48 drives the adjusting component 46 of the pedal simulator 100 to displace it. The displacement of the adjusting component 46 causes the amount of pre-deformation or pre-deformed state or pre-loaded force of the elastically deformable component 44 to change to that corresponding to the selected brake pedal feel option.

In a step 603, the controller 42 controls to stop the adjusting component 46 so that the adjusting component 46 maintains the elastically deformable component 44 at the amount of pre-deformation or pre-deformed state or pre-loaded force corresponding to the selected brake pedal feel option.

In a step 604, the vehicle braking operations are performed. In this step, depressing the brake pedal 12 causes the brake piston 142 of the brake master cylinder 14 to pressurize the brake fluid in the master cylinder chamber 144, the pressurized brake fluid enters the simulator chamber 115 of the brake pedal simulator 100, and the simulator piston 120 is moved to compress the elastically deformable component 44. Meanwhile, the pedal travel of the brake pedal 12 can be derived from the master cylinder travel of the brake master cylinder 14 measured by the master cylinder travel sensor 122 of the active pressure building unit 10 and is provided to the brake control unit 30 of the vehicle brake system. The brake control unit 30 then activates the brake pump 22 of the wheel cylinder brake unit 20, and the brake pump 22 pumps and supplies an amount of brake fluid corresponding to the pedal travel to the brake wheel cylinders 26. Wheels are braked.

Although several embodiments of the present disclosure have been described in detail herein, they are given for explanatory purposes only and should not be considered as limiting the scope of the present disclosure. Meanwhile, it is noted for those skilled in the art that the embodiments described herein may be used in combination with each other. Various substitutions, changes and modifications may be conceived without departing from the spirit and scope of the present disclosure.

The invention claimed is:

1. A brake pedal simulator for a vehicle brake system, comprising:
 a cylindrical simulator cylinder having a first end;
 a simulator piston provided in the simulator cylinder, the simulator piston and the first end of the simulator cylinder defining a simulator chamber therebetween, and the first end having a brake fluid port configured to place the simulator chamber and a master cylinder chamber of a brake master cylinder of the vehicle brake system in fluid communication with each other; and
 an elastically deformable component and an adjusting component, the elastically deformable component being arranged between the simulator piston and the adjusting component and being placed in a pre-deformed state by the simulator piston and the adjusting component, the adjusting component being movable to change an amount of elastic deformation of the elastically deformable component so that the elastically deformable component can assume a plurality of pre-deformed states and is capable of maintaining the elastically deformable component in each of the plurality of pre-deformed states, the elastically deformable component comprising a first elastic element and a second elastic element, opposite ends of the first elastic element abutting the simulator piston and the adjusting component, respectively, and the second elastic element having a first end abutting the simulator piston and an opposite second end fixed relative to the simulator cylinder.

2. The brake pedal simulator according to claim 1, the adjusting component being an adjusting piston provided in the simulator cylinder.

3. The brake pedal simulator according to claim 2, the simulator cylinder having a second end opposite to the first end, the adjusting piston and the second end defining a closed adjusting chamber therebetween, and an adjusting fluid being supplied to and discharged from the adjusting chamber, resulting in displacement of the adjusting piston.

4. The brake pedal simulator according to claim 1, the elastic elements each being provided as an elastomeric block or a spring.

5. The brake pedal simulator according to claim 1, the first elastic element and the second elastic element being arranged in parallel and the first elastic element being arranged in the second elastic element.

6. The brake pedal simulator according to claim 1, being fixed relative to the simulator cylinder comprising abutting or attaching to a stop, the stop being provided separately and secured to the simulator cylinder or being an integral portion protruding inwardly from the simulator cylinder.

7. The brake pedal simulator according to claim 1, the plurality of pre-deformed states including a plurality of consecutive pre-deformed states between a first threshold pre-deformed state and a second threshold pre-deformed state, or the plurality of pre-deformed states including a plurality of pre-deformed states set in a discrete manner.

8. A brake pedal feel selection module for a vehicle brake system, comprising:
 a controller configured to provide a plurality of brake pedal feel options corresponding to a plurality of brake pedal feels and comprises a human-machine interface via which a user can select a desired brake pedal feel option from the plurality of brake pedal feel options;
 the brake pedal simulator according to claim 1; and
 a driving component for driving the adjusting component of the brake pedal simulator to displace it;
 the controller being configured to
  activate the driving component to actuate the adjusting component to displace it based on the desired brake pedal feel option selected by the user, the displacement of the adjusting component changing the amount of elastic deformation of the elastically deformable component, and
  deactivate the driving component to maintain the elastically deformable component in a pre-deformed state corresponding to the desired brake pedal feel option when the elastically deformable component is placed in the pre-deformed state.

9. The brake pedal feel selection module according to claim 8, the driving component actuating the adjusting component in at least one of hydraulic, pneumatic and mechanical manners.

10. The brake pedal feel selection module according to claim 8,
 the adjusting component being an adjusting piston provided in the simulator cylinder, and a second end of the simulator cylinder opposite to the first end and the adjusting piston defining a closed adjusting chamber therebetween, and
 the driving component comprising a driving pump and an inlet control valve which are in fluid communication with an adjusting fluid inlet of the adjusting chamber, and an outlet control valve which is in fluid communication with an adjusting fluid outlet of the adjusting chamber.

11. The brake pedal feel selection module according to claim 10, the driving pump being an electro-hydraulic pump or a pneumatic pump.

12. The brake pedal feel selection module according to claim 8, the human-machine interface being in the form of one or more buttons or toggles actuated by a pressing or toggling action, or in the form of one or more knobs actuated by a rotating action, or in the form of a dialog box to allow the user to enter information.

13. A vehicle brake system comprising:
a brake pedal;
the brake master cylinder comprising a master cylinder piston actuated by the brake pedal and the master cylinder chamber in fluid communication with a brake fluid reservoir; and
the brake pedal feel selection module according to claim 11, the simulation chamber of the brake pedal simulator being in fluid communication with the brake master cylinder via the brake fluid port.

14. The vehicle brake system according to claim 13, further comprising:
a wheel cylinder brake unit comprising: a brake pump, the brake fluid reservoir in fluid communication with the brake pump, and four brake wheel cylinders in fluid communication with the brake pump,
the driving component of the brake pedal feel selection module comprising the brake pump and an adjusting fluid being the brake fluid, or, the driving component being a driving pump provided separately and independently of the brake pump and the adjusting fluid being the brake fluid or a fluid different from the brake fluid.

15. The vehicle brake system according to claim 14, further comprising:
a brake control unit in communication with a master cylinder travel sensor for measuring a pedal travel of the brake pedal and with the brake pump, the brake control unit being configured to activate the brake pump based on the pedal travel measured by the master cylinder travel sensor so that the brake fluid is supplied to the brake wheel cylinder by the brake pump,
the controller of the brake pedal feel selection module being integrated in the brake control unit or provided independently of the brake control unit.

16. The vehicle brake system according to claim 14, an active pressure building unit comprising the brake pedal, the brake master cylinder and the brake pedal simulator and the wheel cylinder brake unit are arranged in a single brake module.

17. A brake pedal simulator for a vehicle brake system, comprising:
a cylindrical simulator cylinder having a first end;
a simulator piston provided in the simulator cylinder, the simulator piston and the first end of the simulator cylinder defining a simulator chamber therebetween, and the first end having a brake fluid port configured to place the simulator chamber and a master cylinder chamber of a brake master cylinder of the vehicle brake system in fluid communication with each other; and
an elastically deformable component and an adjusting component, the elastically deformable component being arranged between the simulator piston and the adjusting component and being placed in a pre-deformed state by the simulator piston and the adjusting component, the adjusting component being movable to change an amount of elastic deformation of the elastically deformable component so that the elastically deformable component can assume a plurality of pre-deformed states and is capable of maintaining the elastically deformable component in each of the plurality of pre-deformed states, the elastically deformable component comprising a first elastic element and a second elastic element, an end of the first elastic element abutting the adjusting component, the second elastic element arranged in series with the first elastic element, the second elastic element having a first end abutting the simulator piston and a second end abutting the first elastic element.

* * * * *